March 3, 1953     A. W. DI LORETO     2,630,187
DASHBOARD INSTRUMENT DRAWER
Filed Oct. 13, 1949
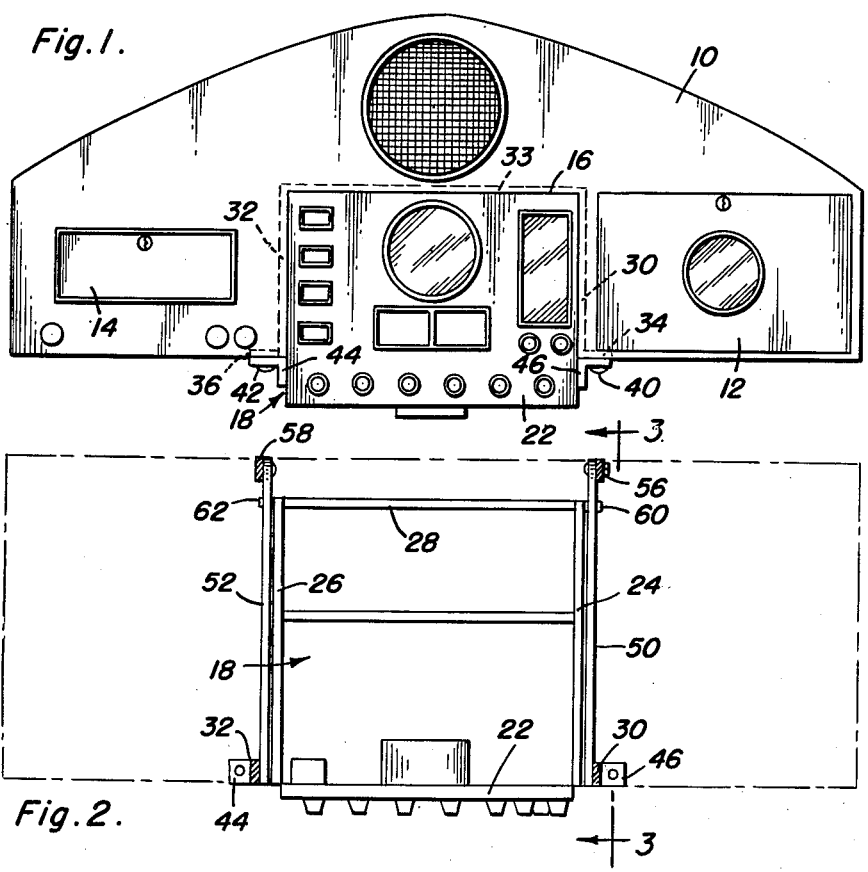
Inventor
Anthony W. DiLoreto
By Clarence A. O'Brien
and Harvey B. Jacobson
Attorneys Patented Mar. 3, 1953

2,630,187

UNITED STATES PATENT OFFICE 2,630,187

DASHBOARD INSTRUMENT DRAWER

Anthony W. Di Loreto, Brewster, Ohio

Application October 13, 1949, Serial No. 121,124

1 Claim. (Cl. 180—90)

This invention relates to novel and useful improvements in attachments for vehicles, and the primary object of the invention is to support the instruments normally appertinent to vehicles in such a manner that they may be easily displaced with respect to the dashboard of the vehicle for repair purposes.

Another object of this invention is to facilitate the original installation of the instruments by centralizing said instruments in a drawer which has a front panel, the front panel being employed to serve as the recipient of the various gauges, dials, buttons, and the like, for view in the dash of the vehicle.

Ancillary objects and features will become apparent in following the description of the illustrated form of the invention.

In the drawings:

Figure 1 is a front view of a typical dash of a vehicle having an article of the invention incorporated therein;

Figure 2 a sectional view of the device showing in phantom the outline of a part of a vehicle and showing in section certain structure normally appertinent to vehicles;

Figure 3 is a view taken substantially along the line 3—3 of Figure 2 and in the direction of the arrows, and Figure 4 is a perspective view of a guide which is employed in conjunction and which forms a part of the invention.

Illustrated as a conventional part of a vehicle is a dash 10 having various elements therein, as the glove compartment door 12 and the accessory compartment 14. Disposed substantially in the center of the dash 10 is one embodiment of the invention. However, it is understood at this point that the article of invention may be supplied in any position whether it be the center, right or left side, this factor being dependent upon the perogative of the manufacturer.

An opening 16 is provided in the dash 10 accommodating a drawer generally indicated at 18. This drawer has a substantially rectangular bottom 20, a front panel 22 and sides 24 and 26. A rear panel 28 is disposed in substantially parallel relationship with the front panel 22. The front panel is apertured in various places in order to accommodate the speedometer, fuel gauge, temperature gauge, cigarette lighter and any other elements found desirable to incorporate therein. A substantially U-shaped bracket having legs 30 and 32 connected by a web 33 is disposed in the opening 16 and has feet 34 and 36 projecting from the ends of the legs which are adapted to be rigidly secured to the bottom part of the dash 10 by any suitable means.

Top openings are supplied in the feet 34 and 36 to accommodate screws 40 and 42 which are passed through one leg of each angle bracket 44 and 46. The angle brackets are firmly fixed to the sides 24 and 26 of the drawer and are employed to form a part of a locking mechanism when used in conjunction with the screws and the top openings in the feet 34 and 36. This structure locks the drawer in place within the dash 10.

The guides (Figure 4) 50 and 52 are secured at their inner ends to the vertical posts 56 and 58, attached to the body of the vehicle, by suitable means as screws or rivets and are also secured at their opposite ends to the legs 30 and 32 of the U-shaped bracket. The guides are retained substantially horizontal and have slots 59 disposed longitudinally therein. Pins 60 and 62 which are fixed to the drawer adjacent the rear panel 28 are disposed in the slots 59 whereby the travel of the drawer is limited by the length of the slots and whereby the drawer is supported for its sliding movement.

A hand grip 66 is disposed on the bottom 20 of the drawer for facility of operation.

In original installation of the instruments of a vehicle, or at least, that portion which is adapted to be viewed by the driver or occupant of an automobile, truck or the like, it is only necessary to assemble the instruments in one location, as on a bench in a regular assembly line. Then, the entire drawer may be inserted in the dash opening 16 and fixed in place as described.

When it is desired to repair the instruments, instead of the necessity of having to assume uncomfortable positions for visibility behind the dash 10 of the vehicle, it is only necessary to slide the drawer outwardly after releasing the locking device consisting of a pair of screws together with the elements in which the screws fasten.

In lieu of the feet 34 and 36, metal screws may be employed which fasten directly into the metal of the dash 10. Further, in lieu of metal screws, standard screws may be used to pass through an opening provided directly in the bottom of the dash 10.

Having thus described the invention, what is claimed as new is:

In combination with an automobile dashboard having an opening therein, means slidably mounting instrument gauges thereon, said means comprising an inverted U-shaped bracket secured to the rear surface of the dashboard and partially surrounding said opening, a pair of posts disposed rearwardly of said dashboard in alignment with said bracket, guide members connecting said posts to said bracket, said guide members having longitudinal slots therein, a drawer disposed in said opening, means on said drawer slidingly and pivotally engaged in said longitudinal slots, a front panel on said drawer normally covering said opening and lying flush with said dashboard, instrument gauges mounted on said panel and means locking said drawer in position, said locking means including a pair of angle brackets secured to opposite sides of said drawer, said U-shaped bracket including laterally extending flanges at the ends of the legs, said flanges and said angle brackets having aligned apertures therethrough, fasteners extending through said apertures and holding said flanges and said angle brackets in abutting relation to one another.

ANTHONY W. DI LORETO.

REFERENCES CITED

The following references are of record in the file of this patent:

UNITED STATES PATENTS

| Number | Name | Date |
|---|---|---|
| 1,048,900 | Sheppy et al. | Dec. 31, 1912 |
| 1,802,345 | Heina | Apr. 28, 1931 |
| 1,835,456 | Bernard et al. | Dec. 8, 1931 |
| 2,374,622 | Rugg | Apr. 24, 1945 |

FOREIGN PATENTS

| Number | Country | Date |
|---|---|---|
| 579,358 | Great Britain | July 31, 1946 |